United States Patent
Hemmert et al.

(10) Patent No.: US 10,105,783 B2
(45) Date of Patent: Oct. 23, 2018

(54) ELECTRODE DIAMETER SENSING CONSUMABLES

(71) Applicant: ILLINOIS TOOL WORKS INC., Glenview, IL (US)

(72) Inventors: Bradley William Hemmert, Neenah, WI (US); Mark Steven Kadlec, Shiocton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 322 days.

(21) Appl. No.: 14/971,378

(22) Filed: Dec. 16, 2015

(65) Prior Publication Data
US 2016/0101480 A1    Apr. 14, 2016

Related U.S. Application Data

(63) Continuation of application No. 13/491,259, filed on Jun. 7, 2012, now Pat. No. 9,266,184.

(51) Int. Cl.
*B23K 9/10* (2006.01)
*B23K 9/28* (2006.01)
(Continued)

(52) U.S. Cl.
CPC ............ *B23K 9/0953* (2013.01); *B23K 9/095* (2013.01); *B23K 9/0956* (2013.01);
(Continued)

(58) Field of Classification Search
CPC .... B23K 9/095; B23K 9/0953; B23K 9/0956; B23K 9/1062; B23K 9/125; B23K 9/123;
(Continued)

(56) References Cited

U.S. PATENT DOCUMENTS 4,415,792 A   11/1983   Jordan
4,527,045 A    7/1985   Nakajima
(Continued)

FOREIGN PATENT DOCUMENTS

CN       2089612    11/1991
CN     201385174     1/2010
(Continued)

OTHER PUBLICATIONS

Japanese to English translation for JP S6163368.*
International Search Report from PCT application No. PCT/US2013/044210 dated Oct. 2, 2013, 13 pgs.

*Primary Examiner* — Michael G Hoang
(74) *Attorney, Agent, or Firm* — McAndrews, Held & Malloy, Ltd.

(57) ABSTRACT

The present disclosure provides a welding system capable of detecting a size of a welding material and automatically implementing appropriate arc starting parameters. The welding system includes a welder, a welding torch, and a sensor, in which the sensor is configured to detect the size of the welding material, directly or indirectly. The welder is automatically configured to produce an arc having the arc starting parameters determined from the size of the welding material detected by the sensor. The present disclosure decreases operational error by automatically changing arc starting parameters and/or welding parameters based upon a change in welding material size, rather than requiring an operator to manually change the arc starting parameters and/or welding parameters.

20 Claims, 6 Drawing Sheets

(51) Int. Cl.
*B23K 9/095* (2006.01)
*B23K 9/24* (2006.01)
*B23K 9/167* (2006.01)
*B23K 9/12* (2006.01)
*B23K 9/133* (2006.01)
*B23K 9/173* (2006.01)
*B23K 9/32* (2006.01)

(52) U.S. Cl.
CPC ............ *B23K 9/1062* (2013.01); *B23K 9/125* (2013.01); *B23K 9/133* (2013.01); *B23K 9/167* (2013.01); *B23K 9/173* (2013.01); *B23K 9/24* (2013.01); *B23K 9/28* (2013.01); *B23K 9/282* (2013.01); *B23K 9/287* (2013.01); *B23K 9/32* (2013.01)

(58) Field of Classification Search
CPC .......... B23K 9/282; B23K 9/295; B23K 9/16; B23K 9/173; B23K 9/24; B23K 9/26; B23K 9/28; B23K 9/167; B23K 9/133; B23K 9/32

USPC ..... 219/124.1, 125.1, 130.01, 130.1, 130.21, 219/130.4, 137 R, 137.2, 137.31, 137.61, 219/137.63

See application file for complete search history.

(56) References Cited

U.S. PATENT DOCUMENTS

| | | | |
|---|---|---|---|
| 5,357,076 | A | 10/1994 | Blankenship |
| 6,130,407 | A * | 10/2000 | Villafuerte ........... B23K 9/0956 219/130.01 |
| 9,144,862 | B2 * | 9/2015 | Hemmert ............. B23K 9/0956 |
| 2001/0040153 | A1 | 11/2001 | Lanouette |
| 2004/0004113 | A1 | 1/2004 | Blankenship |
| 2004/0026392 | A1 | 2/2004 | Feichtinger |
| 2004/0050824 | A1 | 3/2004 | Samler |
| 2005/0061784 | A1 | 3/2005 | Matus |
| 2005/0161448 | A1 | 7/2005 | Stava |
| 2011/0072952 | A1 | 3/2011 | Koyama |

FOREIGN PATENT DOCUMENTS

| | | |
|---|---|---|
| JP | S6163368 | 4/1986 |
| SU | 1123802 | 11/1984 |

* cited by examiner

ELECTRODE DIAMETER SENSING CONSUMABLES

CROSS REFERENCE TO RELATED APPLICATIONS

This application is a Continuation Patent Application of U.S. Non-Provisional application Ser. No. 13/491,259, entitled "Electrode Diameter Sensing Consumables", filed Jun. 7, 2012, which is herein incorporated by reference in its entirety for all purposes.

BACKGROUND

The invention relates generally to welding systems, including welders and welding torches. Specifically, the present disclosure relates to systems and methods for detecting the diameter of a welding material used in a welding operation and automatically setting appropriate welding parameters.

Welding systems have become virtually ubiquitous throughout industry. Such systems are currently used in all industries, including manufacturing, physical plant construction, shipbuilding, pipeline construction, maintenance and repair, and so forth. Many welding applications may be complex projects that often require different types of welds to be made, including welds of different sizes. Such welds often require the use of welding material of different sizes. For example, a fine weldment may require the use of a relatively thin welding wire and a large, robust weldment may require the use of a relatively thick welding wire. In order to complete such a project, welding material of one size may need to be swapped out for a welding material of a different size. This may occur one of more times during a single welding operation or session. Generally, an operator must stop welding and manually change the welding material.

Additionally, for best performance, welding material of a certain size generally requires a specific set of welding parameters such as arc starting parameters. Amperage level is an example. As such, when welding material is changed, the operator generally must return to the welder to manually change and/or set one or more of these parameters. Unfortunately, this creates a higher probability of operator error for many reasons. For example, an operator may not be aware that arc starting parameters should be changed when changing the welding material, and even a user who is aware may forget to do so. It may also be the case that the user does change the arc starting parameters, but changes them to an incorrect setting. This may result in a decrease in productivity, as well as in poor weld quality. Accordingly, there exists a need for improved welding systems that overcome such drawbacks.

BRIEF DESCRIPTION

In an exemplary embodiment, a welding system includes a welding torch, a welder coupled to the welding torch configured to produce a welding arc in the welding torch, and a sensor configured to sense a parameter indicative of a size of a welding material used by the welding torch. The sensor is configured to send a signal to the welder, the signal representing the parameter indicative of the size of the welding material. The welder is configured to automatically implement at least one of an arc starting parameter or a welding parameter based on the signal.

In another embodiment, a welding system includes a welding torch including a sensor configured to sense a parameter indicative of a size of a welding material used by the welding torch and to output a signal representative of the sensed parameter, and a controller disposed within a welder. The controller is configured to receive the signal from the sensor, to convert the signal into a corresponding set of arc starting parameters or welding parameters, and to implement the arc starting parameters or welding parameters.

In another embodiment, a method includes the steps of determining a sensor signal using a sensor associated with a welding torch, in which the sensor signal is indicative of a size of a welding material used by the welding torch, communicating the sensor signal from the sensor to a controller disposed within a welder, processing the sensor signal by translating the sensor signal into a corresponding set of arc starting parameters or welding parameters, and implementing the corresponding set of arc starting parameters or welding parameters in the welder, in which the welder is configured to produce an arc with the corresponding set of arc starting parameters or welding parameters.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in greater detail below, provided herein are embodiments of welding systems including material sensing and control systems adapted to provide an indication of the size of a welding material in a welding device (e.g., a welding torch, an electrode holder, and so forth) in order to automatically change and/or set welding parameters such as arc starting parameters suited for the particular welding material size. For example, in one embodiment, the material sensing system may sense when a welding wire of size A has been replaced by a welding wire of size B in a welding torch, and the control system may automatically adjust one or more arc starting parameters accordingly upon detection of the new size of welding wire. For further example, in such an embodiment, the control system may alter an amperage setting of a welder to produce less heat, as welding wire of size B may perform better at a lower temperature compared to welding wire of size A. Similarly, in some embodiments, the amperage may be increased or decreased, or other parameters may be altered in a suitable manner to provide ideal welding parameters for a specific welding material size.

The automated selection and implementation of appropriate arc starting parameters frees an operator from having to manually set the correct arc starting parameters when changing welding material sizes. As such, the welding system presented herein lowers the potential of having incorrect arc starting parameters when welding material is changed, as the correct arc starting parameters are determined and set automatically. Additionally, the welding system presented herein may also be configured to automatically set, maintain, and adjust other operating or welding parameters during welding. The disclosed welding system may be used with many types of welding methods and equipment, including gas tungsten arc welding (GTAW) welding, gas metal arc welding (GMAW) welding, shielding metal arc welding (SMAW) welding, and so forth. For brevity and illustrative purposes, only a sample of the embodiments of the disclosed welding system is included in the present disclosure.

Figure 1:
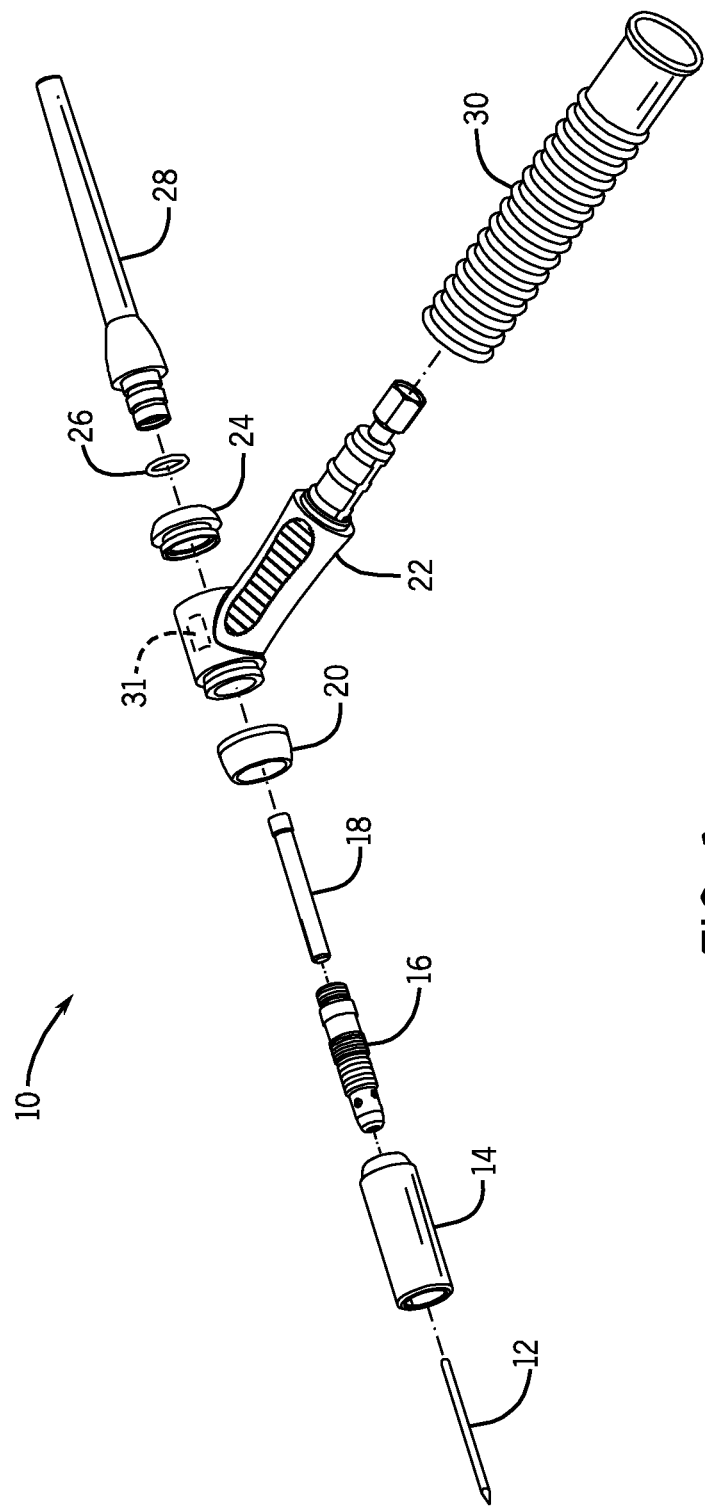
FIG. 1 is an exploded view of a GTAW welding torch, in accordance with embodiments of the present disclosure.
Figure 3:
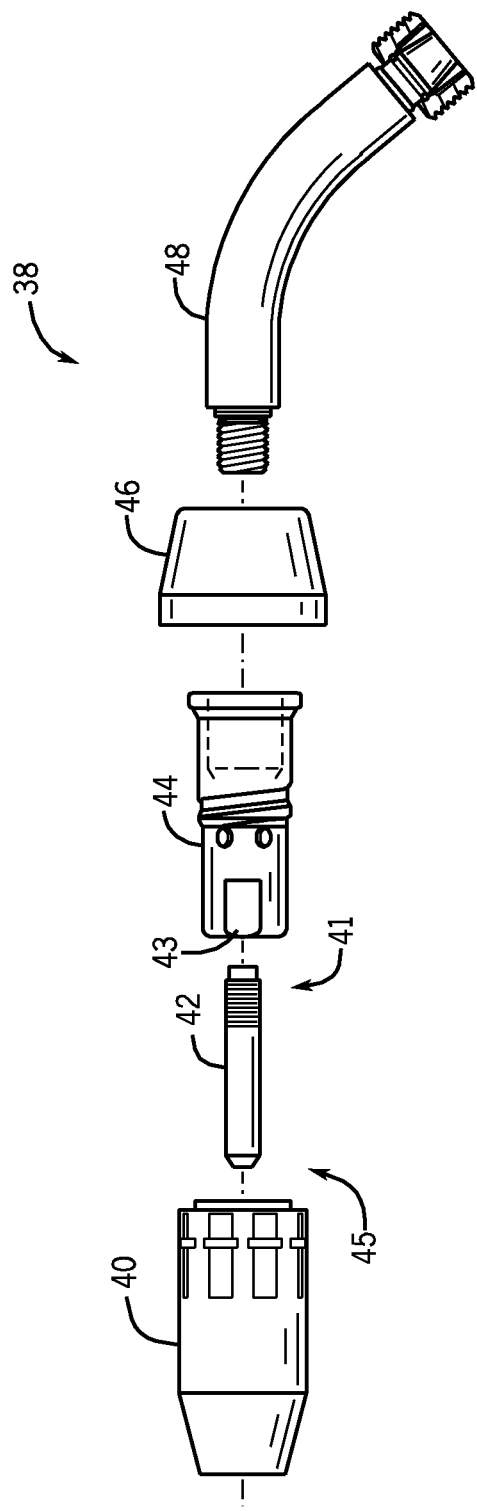
FIG. 3 is an exploded view of a GMAW welding torch, in accordance with embodiments of the present disclosure.
Figure 5:
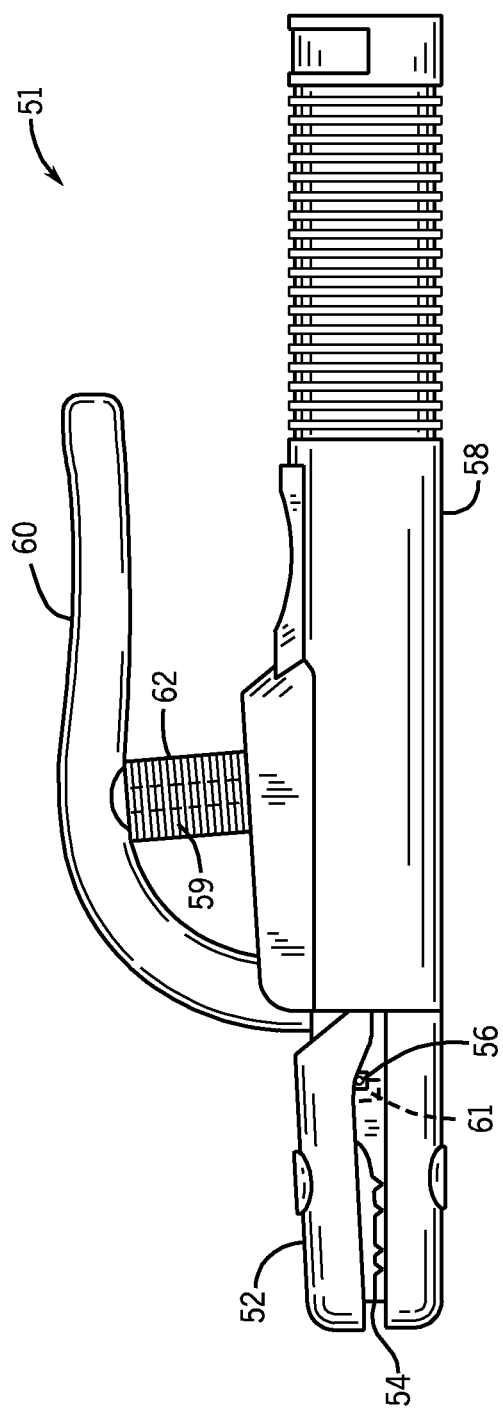
FIG. 5 is a side view of an electrode holder to be used with an SMAW welding system, in accordance with embodiments of the present disclosure.
Figure 7:
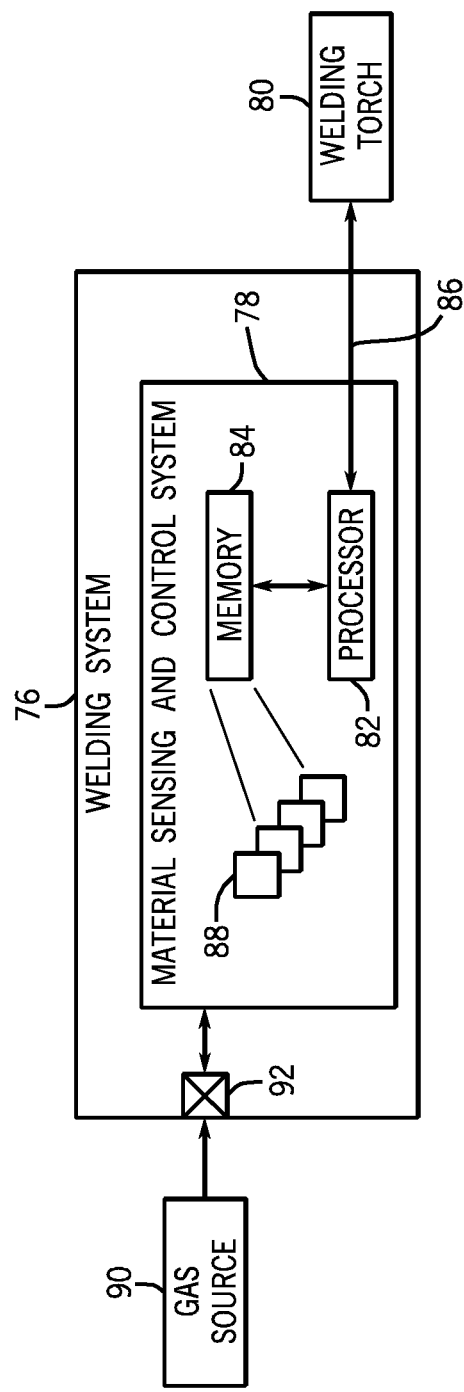
FIG. 7 is a welding system that includes a material sensing and control system, in accordance with embodiments of the present disclosure.

Turning now to the figures, FIG. 1 is an exploded view of a GTAW welding torch 10 that may be used in a welding system, such as the welding system 76 illustrated in FIG. 7. It should be noted that the GTAW welding torch 10 illustrated in FIG. 1 is but one exemplary type of welding torch that may utilize the material sensing techniques described herein. For example, additional exemplary welding torches that may utilize the present techniques are illustrated in FIGS. 3 and 5. In the embodiment illustrated in FIG. 1, the GTAW welding torch 10 includes an electrode 12, a cup 14, a collet body 16, a collet 18, a heat shield 20, a torch body 22, a back cap insulator 24, an o-ring 26, a back cap 28, and a handle 30. When fully assembled, the electrode 12 is generally disposed inside the collet 18, and the collet 18 is generally disposed inside the collet body 16 in a concentric manner as shown. When the collet 18 is disposed inside the collet body 16, the collet body 16 applies an inward force around the collet 18, such that the collet 18 tightly grips the electrode 12. In general, electrodes 12 of different sizes may be used to create different types of welds, and are interchangeable. Accordingly, each electrode 12 size is generally accompanied by a collet 18 and collet body 16 of corresponding sizes. Thus, when the electrode 12 is changed, the collect body 16 and collet 18 may be changed as well.

In certain embodiments, the arc starting or welding parameters may be set by sensing the configuration, size, and/or type of the electrode 12 itself, the collet 18, the collet body 16, or any combination or relationship of the above, all of which may include information indicative of the configuration, size, and/or type of the electrode 12 being used. Generally, a sensor 31 may be used to collect this data and communicate the data, in the form of a signal, to a material sensing and control system (e.g., the material sensing and control system 78 illustrated in FIG. 7) that may be located, for example, within a welding system (e.g., the welding system 76 illustrated in FIG. 6), and is configured to receive such a signal from the sensor 31. For example, in certain embodiments, the sensor 31 may be integrated into the torch body 22 of the GTAW welding torch 10 such that when the collet body 16 is attached to the torch body 22, the sensor 31 may sense information from the collet body 16 (and/or collet 18 and/or electrode 12, etc.) relating to the configuration, size and/or type of the electrode 12. The sensor 31 and the material sensing and control system 78 may be coupled together by a data cable, which conveys the signal from the sensor 31 to the material sensing and control system 78. For example, in certain embodiments, the data cable may extend through the torch body 22 and the handle 30, and connect the GTAW welding torch 10 to the material sensing and control system 78.

As described in greater detail below with respect to FIG. 7, the material sensing and control system 78 includes control and processing circuitry configured to receive a plurality of inputs, including a sensor signal from the sensor 31. The material sensing and control system 78 may be configured to receive and process various data types, including voltage, image data, frequency, and so forth. The material sensing and control system 78 may also include volatile or non-volatile memory such as magnetic storage memory, optical storage memory, or a combination thereof. Furthermore, a variety of control parameters, including amperage or frequency of welding output, may be stored in the memory, along with machine readable and executable instructions (e.g., computer code) configured to provide a specific output relating to such parameters, given one or more specific inputs. At least one source of input may be the sensor signal received by the material sensing and control system 78. Thus, upon receiving the sensor signal, the processing circuitry translates the sensor signal into machine readable data, which becomes an input to the machine executable instructions, and through execution of the instructions, the corresponding arc starting or welding parameters are determined, and the material sensing and control system 78 operates to automatically implement such parameters accordingly. As such, the material sensing and control system 78 is capable of automatically determining configuration, size and/or type information relating to the electrode 12, and automatically (e.g., without user input) select and implement welding parameters for the GTAW welding torch 10.

Figures 2A, 2B:
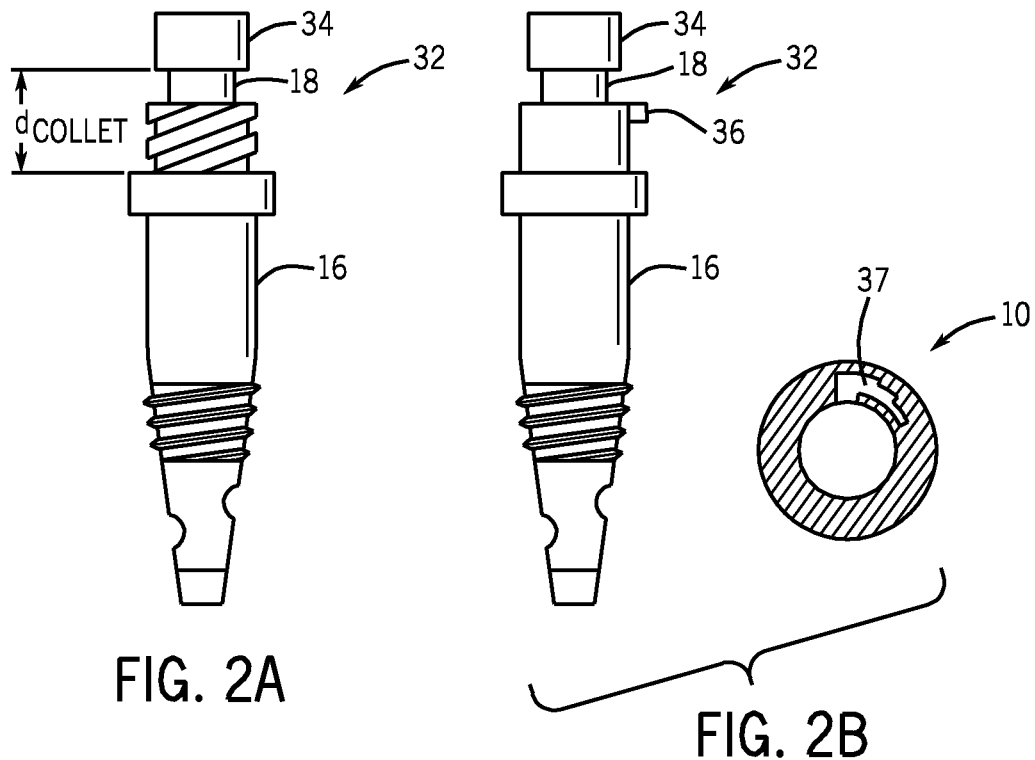
FIG. 2A is a view of a collet and collet body assembly, in accordance with embodiments of the present disclosure.
FIG. 2B is a view of an alternate collet and collet body assembly, in accordance with embodiments of the present disclosure.

The embodiments described herein may include many types of material sensing systems and methods. FIG. 2A is a detailed view of a collet and collet body assembly 32 of the GTAW welding torch 10 of FIG. 1, wherein the collet 18 is disposed inside the collet body 16. As illustrated, the collet 18 includes a collet end 34, which generally remains outside of the collet body 16. Different collets, as used with electrodes 12 of respective sizes, may have different lengths. Accordingly, when fully disposed, a distance $d_{collet}$ between the collet end 34 and the collet body 16 may vary, and this distance may be indicative of the size (or other parameters, such as a configuration, type, and so forth) of the electrode 12 used. Thus, in certain embodiments, the GTAW welding torch 10 (and associated material sensing and control system 78) may be configured to sense the distance $d_{collet}$ between the collet end 34 and the collet body 16 as an indicator of the electrode size, and then subsequently automatically select correct arc starting or welding parameters. For example, in certain embodiments, the sensor 31 employed may be an optical sensor configured to optically determine the distance $d_{collet}$ between the collet end 34 and the collet body 16. For further example, the optical sensor may be a low-pixel camera (such as that used in an optical computer mouse) located inside the GTAW welding torch 10 facing the collet end 34 and the respective edge of the collet body 16. The low-pixel camera may send an image of the collet end 34 and respective edge of the collet body 16 to the material sensing and control system 78, which through image processing is capable of detecting the distance $d_{collet}$ between the collet end 34 and the collet body 16. Thus, the size of the electrode 12 used may be detected. However, as described above, in other embodiments, the distance $d_{collet}$ between the collet end 34 and the collet body 16 may be indicative of other properties related to the electrode 12 being used. For example, particular distances $d_{collet}$ may be mapped to different types of electrodes 12, and the material sensing and control system 78 may be configured to translate the distances $d_{collet}$ into the mappings (e.g., which may be stored in a memory of the material sensing and control system 78 in, for example, a lookup table) to determine the type of electrode 12 used.

As another example, FIG. 2B illustrates another collet and collet body assembly 32, in which the collet body 16 includes a key piece 36 attached on an outward side of the collet body 16. As described above, when the electrode size is changed, the collet body 16 may be changed as well. Thus, in this embodiment, each different collet body 16 may be associated with a key piece 36 in a unique position or configuration such that each different collet body 16 fits into the GTAW welding torch 10 in a unique position within, for example, a corresponding receiving portion such as a groove 37 of the GTAW welding torch 10, allowing the collet body 16 to be identifiable based on its key piece configuration and/or position. Thus, the GTAW welding torch 10 may be able to detect which collet body 16 is being used by the position of the collet body 16 and/or by which unique key piece 36 is inserted.

In other words, in certain embodiments, both the distance $d_{collet}$ between the collet body 16 and the collet end 34 of the collet 18 and the unique key piece 36 that extends from the collet body 16 may be used to convey information relating to the electrode 12 being used. For example, the distance $d_{collet}$ between the collet body 16 and the collet end 34 of the collet 18 may convey a first piece of information (e.g., the size of the electrode 12) and the unique key piece 36 that extends from the collet body 16 may convey a second piece of information (e.g., the type of the electrode 12). As another example, specific combinations of the distance $d_{collet}$ between the collet body 16 and the collet end 34 of the collet 18 and the unique key piece 36 that extends from the collet body 16 may, in combination, convey the information relating to the electrode 12 being used.

Additionally, in certain embodiments, the different collets 18 may be marked with different colored markers or LEDs, the different colors corresponding to the different sizes (or other properties) of the respective electrodes 12. Again, an optical sensor may be configured to detect the color or frequency emitted by the marker or LED on the collet 18. An optical type sensor may be configured in other ways to detect the size of the electrode 12 used. Furthermore, an optical sensor may be also be employed in welding systems other than GTAW welding systems, and/or in detecting the size of welding materials other than electrodes 12.

Furthermore, in certain embodiments, collets 18 may have different resistance values that may be varied. Thus, the GTAW welding torch 10 may be configured to identify the collet 18 used by measuring the resistance of the collet 18. This may be accomplished by coating or forming the collets 18 or collet ends 34 with different materials or thicknesses to vary the resistance of the different collets 18 or collet ends 34. As such, contactors inside the GTAW welding torch 10 may be used to measure the resistance of the collet 18 or collet end 34 in the GTAW welding torch 10. Accordingly, the measured resistance value or equivalent voltage may be used by the material sensing and control system 78 to identify the size (or other parameter) of the electrode 12 and thus, the appropriate arc starting parameter settings. Again, one or more of these sensing techniques (e.g., sensing distances, the existence of unique keys, optical properties, resistance values, and so forth) may be combined together in certain embodiments.

As previously mentioned, the material sensing techniques described herein may be used with different welding methods and welding equipment. For example, FIG. 3 illustrates an exploded view of a GMAW welding torch 38 capable of detecting the size of welding material used, such as welding wire. In the illustrated embodiment, the GMAW welding torch 38 includes a nozzle 40, a contact tip 42, a diffuser 44, an insulator cap 46, and a torch body 48. When assembled, a first end 41 of the contact tip 42 is disposed in a receptacle 43 of the diffuser 44, such that the first end 41 of the contact tip 42 is securely coupled to the diffuser 44. In certain embodiments, the contact tip 42 may be screwed into the receptacle 43. The nozzle 40 may be generally disposed over the diffuser 44 and contact tip 42, leaving a second end 45 of the contact tip 42 exposed, the second end 45 being the end opposite the first end 41, which is disposed in the receptacle 43 of the diffuser 44.

Figure 4:
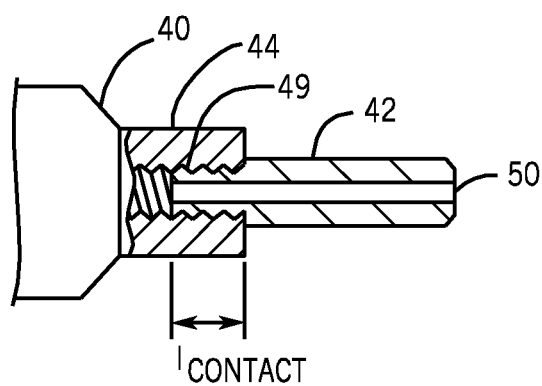
FIG. 4 is a cross-sectional view of an assembled nozzle, diffuser, and contact tip of a GMAW welding torch, in accordance with embodiments of the present disclosure.

FIG. 4 is a cross-sectional view of an assembled GMAW welding torch 38, specifically showing the nozzle 40, the diffuser 44, and the contact tip 42. The contact tip 42 further includes a wire channel 50. Generally, welding wire travels from the GMAW welding torch 38, through the wire channel 50, to the outside of the contact tip 42, where it is consumed. The wire channel 50 of the contact tip 42 is generally configured to fit a welding wire of a certain size. Thus, as the welding wire is changed from one size to another, the contact tip 42 may be changed respectively. As such, the size of the welding wire being used is generally indicated by the particular contact tip 42 that is used. In certain embodiments, the GMAW welding torch 38 may sense the identity of the contact tip 42 used and set the appropriate arc starting or welding parameters according to the wire size associated with the particular contact tip 42 used. Different contact tips 42 may have different configurations. For example, a length $l_{contact}$ of the portion of the contact tip 42 that is disposed in the receptacle 43 may vary according to the size of the welding wire used in the contact tip 42. As such, a sensor 49 in the receptacle 43 or diffuser 44 may measure or detect the disposed length of the contact tip 42. Thus, the identity of the contact tip 42 and welding wire size may be obtained, and correct arc starting and/or welding parameters for such a welding wire size may be implemented by the material sensing and control system 78.

It should be noted that in some embodiments, the actual welding wire size may not actually be determined or obtained at any point during sensing or processing. Such embodiments may detect a certain characteristic related to the welding wire size such as the configuration of a contact tip 42, collet 18, etc., and directly translate the characteristic into the appropriate arc starting parameters, bypassing consideration of the actual wire size. In such embodiments, the material sensing and control system 78 may store in memory a reference of preset relationships between such characteristic values and the correct arc starting parameters. For example, the material sensing and control system 78 may store a reference table in memory that lists each possible collet length (or associated sensor signal) and the correct arc starting or welding parameters for each possible collet length (or associated sensor signal). Thus, as described herein, obtaining welding material size may be interpreted as obtaining a representation of welding material size, rather than the direct measurement itself In certain embodiments, the welding system may include an SMAW welding system. FIG. 5 is a side view of an electrode holder 51 to be used with an SMAW welding system. The illustrated electrode holder 51 includes a clamp 52 with teeth 54, and a pivot 56 secured to the clamp 52 such that the clamp 52 may open and close at one end. The clamp 52 is generally coupled to a handle 58 of the electrode holder 51. One side of the clamp 52 may be coupled to a lever 60 such that when the lever 60 is depressed, the clamp 52 is opened. Further, the lever 60 may be coupled to the handle 58 by a spring 62 that exerts an upward pushing force on the lever 60 such that the clamp 52 has a closing tendency. In general, a consumable electrode is held between the teeth 54 of the clamp 52 during welding operation. The thicker the consumable electrode, the more separated the clamp teeth 54 will be during welding operation.

Thus, in certain embodiments, the electrode holder 51 may be configured to sense the size of the consumable electrode. Once the degree of openness of the clamp 52 is directly correlated with the size of the consumable electrode it is holding, the pivot 56 of the clamp 52 may be mechanically coupled to a potentiometer 61 such that the potentiometer 61 is turned at a degree proportional to the rotation of the pivot 56. As the rotation of the pivot 56 is directly correlated with the openness of the clamp 52, which in turn is directly correlated with the size of the consumable electrode, the potentiometer 61 output generally reflects the size of the consumable electrode. Thus, the size of the consumable electrode may be detected, and appropriate arc starting or welding parameters may be automatically determined and implemented.

Additionally, in certain embodiments, the size of the consumable electrode held between the teeth 54 of the clamp 52 may be detected by measuring the distance between the lever 60 and the handle 58, as the position of the lever 60 is generally proportional to the distance between the teeth 54 of the clamp 52. In such an embodiment, the lever 60 may include a linear contactor 59 extending from the lever 60, through the inside of the spring 62, and through a hole in the handle 58. At corresponding positions inside the handle 58 are a plurality of receiving contactors arranged linearly in the direction of the linear contactor 59. Thus, as the lever 60 is depressed, the linear contactor 59 lowers further through the spring 62 and makes contact with one or more receiving contactors. The receiving contactors are arranged such that as the linear contactor 59 is further lowered through the spring 62, more or different receiving contactors become electrically coupled to the linear contactor 59. Thus, with appropriate circuitry, the position of the lever 60, and thus the size of the consumable electrode, may be detected. Additionally, in certain embodiments, the electrode holder 51 (and other welding torches) may employ a strain gauge in obtaining a representation of welding material size.

The disclosed material sensing techniques are capable of sensing the size (or other parameter) of welding material used in a welding process, either directly by sensing the welding material itself or indirectly by sensing the configuration of a welding consumable such as the collet 18, collet body 16, contact tip 42, clamp 52, and so forth. In certain embodiments, the parameters of the welding material may be sensed continuously, and the arc starting parameters may be changed when a change in the sensed material parameter occurs. In other embodiments, the parameters of the welding material may be sensed only one time per material change. For example, parameters of the welding material may only be sensed upon the insertion of a collet 18 (in a GTAW welding torch), as the insertion of a collet 18 may signify a change in welding material size, for example. Further, in certain embodiments, insertion of the collet 18 may depress a trigger, which sends a signal to the material sensing and control system 78 to collect data from the sensor.

Figure 6:
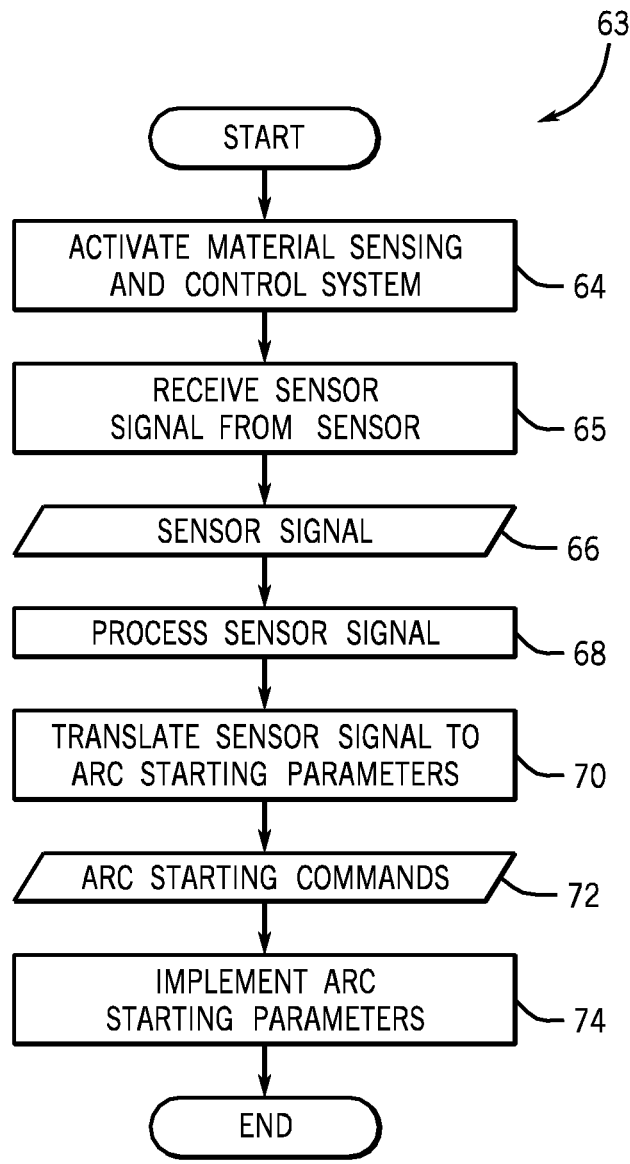
FIG. 6 is a flow chart illustrating the process of automatically implementing arc starting parameters, in accordance with embodiments of the present disclosure.

FIG. 6 illustrates a method 63 that may be employed to sense the welding material size (or other property of the welding material) and automatically implement appropriate arc starting parameters, in accordance with an embodiment of the present invention. The method 63 includes the steps of activating the material sensing and control system 78 (block 64) and receiving one or more sensor signals from a sensor relating to the size of the welding material used (block 65). Activating the material sensing and control system 78 (block 64) may include turning the entire welding system 76 on such that the material sensing and control system 78 is activated when the welding system 76 is activated. In certain embodiments, activating the material sensing and control system 78 (block 64) may occur when a trigger of the welding torch is triggered, signifying that welding material is being changed. Such embodiments may include sensing when a portion of the welding torch is opened or closed, removed or inserted, such actions being necessary for changing welding material. For example, in certain embodiments, a button or switch disposed inside the welding torch may be depressed when a collet 18, contact tip 42, etc., is inserted into the welding torch.

Next, a sensor signal (block 66) is outputted from the sensor and acts as an input to the material sensing and control system 78. The sensor signal (block 66) may include a variety of signal types, such as image data, voltage, frequency, and so forth. The sensor signal (block 66) is then processed by the material sensing and control system 78 (block 68). This step may include converting the raw sensor signal into computer usable data compatible with the material sensing and control system 78. For example, the material sensing and control system 78 may store a predetermined list of possible sensor signal values and the set of arc starting and/or welding parameters that correspond to each sensor signal. The material sensing and control system 78 further translates the sensor signal into a set of arc starting and/or welding parameters (block 70) by matching the received sensor signal to one of the predetermined sensor signals, and thus the correct parameters. In certain embodiments, the predetermined sensor signals may be organized as discrete values or be divided into ranges. As such, the received sensor signal may also be discrete and match a predetermined sensor signal exactly, or it may be an analog value that may fall into one of the predetermined sensor signal ranges.

As the sensor signal is matched to the correct arc starting parameters, a set of arc starting commands (block 72) is outputted. For example, if a sensor signal having a voltage within a first range is received, a first arc starting or operational command may be produced, and if a sensor signal having a voltage within a second range is received, a second arc starting or operational command may be produced. The arc starting command (block 72) may then be the input used to implement the appropriate arc starting or welding parameters for the welding system 76, which correspond to the received sensor signal (block 74). According to the presently disclosed method 63, the correct arc starting or welding parameters are automatically implemented according to the size (or other property) of the welding material used, without the need for operator intervention.

The system for implementing the method 63 of FIG. 6 is depicted in FIG. 7, which illustrates an exemplary welding system 76 that includes a material sensing and control system 78. The welding system 76, such as a welder, may be coupled to a welding torch 80. The welding system 76 and/or the material sensing and control system 78 may further include a processor 82 which receives inputs such as sensor data from the welding torch 80 via a communication cable 86. The processor 82 may also send control commands to the welding output portion of the welding system 76 in order to implement the correct welding parameters. Further, the processor 82 is generally coupled to a memory 84, which may include one or more software modules 88 that contain executable instructions, transient data, input/output correlation data, and so forth. Generally, the processor 82 receives sensor data from the welding torch 80, references data stored in the memory 84 to find the welding parameters that correspond to the received sensor data, and implements the parameters. As previously mentioned, the welding system 76 may also be coupled to a gas source 90, which may provide shielding gas to the welding system 76. As such, a gas valve 92 may be included in the welding 76 and configured to be controlled by the material sensing and control system 78, as gas flow may be considered an arc starting or welding parameter in certain embodiments.

It should be noted that, in other embodiments, the above-mentioned processes may or may not all occur in the material sensing and control system 78. For instance, there may be one or more controllers or processors that control different aspects of the welding system 76. In certain embodiments, a first system receives the sensor signal and is distinct from, but coupled to, a second system that processes the sensor signal, which may also be distinct from, but coupled to, a third system that implements the arc starting or welding parameters. Alternatively, the same system may receive and process the sensor signal, while another system implements the arc starting and/or welding parameters.

As illustrated in FIG. 7, the material sensing and control system 78 may be provided as an integral part of the welding system 76 in some embodiments. That is, the material sensing and control system 78 may be integrated into the welding system 76, for example, during manufacturing of the welding system 76. Such a welding system 76 may also include appropriate computer code programmed into the software to support the material sensing and control system 78. However, in other embodiments, the material sensing and control system 78 may be provided as a retrofit kit that may enable existing welding systems 76 with the material sensing and control capabilities described herein. To that end, such retrofit kits may be configured as add-ons that may be installed onto existing welding systems 76, providing material sensing and control capabilities. Further, as the retrofit kits may be installed on existing welding systems 76, they may also be configured to be removable once installed. Additionally, both the integrated and the retrofit systems may be configured for wired or wireless communication between the material sensing unit and one or more controllers of the welding system 76.

Further, in certain embodiments, the gas source 90 may be configured to supply shielding gases, such as argon, helium, carbon dioxide, and so forth, to the welding torch 80 for use in the welding operation. In such embodiments, the gas may enter the gas valve 92 located in the welding system 76. The gas valve 92 may be configured to communicate with the material sensing and control system 78, such that the material sensing and control system 78 may also control the flow of gas to the welding torch 80. As such, the welding system 76 may also be configured to automatically change and/or set gas flow parameters based on the welding material that is sensed by the material sensing and control system 78. In a sense, gas flow parameters may also be considered an arc starting and/or welding parameter.

As described above, the presently disclosed welding system 76 may employ numerous technical methods of detecting an indication of the size of welding material used in a welding process. Examples of such methods include optical methods, mechanical methods, electrical methods (e.g., resistance, voltage, etc.), and so forth. Likewise, many different control schemes, hardware components, and software components may be configured in a variety of ways to provide the correct arc starting parameters based on the welding material used.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a gas metal arc welding (GMAW) torch;
   a welder coupled to the GMAW torch configured to produce a welding arc in the GMAW torch; and
   a sensor configured to sense a parameter indicative of a size of a welding material used by the GMAW torch by detecting a configuration of a contact tip used by the GMAW torch, wherein the sensor is configured to send a signal to the welder, the signal representing the parameter indicative of the size of the welding material, wherein the welder is configured to automatically implement at least one of an arc starting parameter or a welding parameter based on the signal.

2. The welding system of claim 1, wherein the configuration of the contact tip is indicative of the size of the welding material.

3. The welding system of claim 1, wherein the configuration of the contact tip comprises a length of the contact tip disposed in a contact tip receptacle of the GMAW weld torch.

4. The welding system of claim 1, wherein the sensor is disposed within the GMA W torch.

5. The welding system of claim 1, wherein the sensor is configured to be separable from the GMAW torch.

6. The welding system of claim 1, wherein the welder comprises computer readable code configured to receive the signal as an input, and output executable instructions for implementing the arc starting parameter, the welding parameter, or both, in the welder.

7. The welding system of claim 1, wherein the welder comprises a memory that stores a predefined set of possible signal values and the arc starting parameter or the welding parameter to be implemented in response to each of the possible signal values.

8. The welding system of claim 1, wherein the sensor sends the signal to the welder wirelessly.

9. A welding system, comprising:
   a GMAW torch comprising a sensor configured to sense a parameter indicative of a size of a welding material used by the GMAW torch by detecting a configuration of a contact tip used by the GMAW torch, and to output a signal representative of the sensed parameter; and
   a controller configured to receive the signal from the sensor, to convert the signal into a corresponding set of arc starting parameters, welding parameters, or both, and to implement the arc starting parameters, the welding parameters, or both.

10. The welding system of claim 9, wherein the configuration of the contact tip is indicative of the size of the welding material.

11. The welding system of claim 9, wherein the configuration of the contact tip comprises a length of the contact tip disposed in a contact tip receptacle of the GMAW torch.

12. The welding system of claim 9, wherein the sensor is configured to be separable from the GMA W torch.

13. The welding system of claim 9, wherein the controller is configured to be separable from a welder.

14. The welding system of claim 9, wherein the controller comprises a memory that stores a predefined set of possible signal values and the arc starting parameters or the welding parameters to be implemented in response to each of the possible signal values.

15. The welding system of claim 9, wherein the controller is integrated into a welder.

16. The welding system of claim 9, wherein communication between the sensor and the controller is wireless.

17. A method, comprising:
  determining a sensor signal by detecting a configuration of a contact tip used by a GMAW torch using a sensor associated with the GMAW torch, wherein the sensor signal is indicative of a size of a welding material used by the GMAW torch;
  communicating the sensor signal from the sensor to a controller disposed within a welder;
  processing the sensor signal by translating the sensor signal into a corresponding set of arc starting parameters, welding parameters, or both; and
  implementing the corresponding set of arc starting parameters or welding parameters in the welder, wherein the welder is configured to produce an arc with the corresponding set of arc starting parameters, welding parameters, or both.

18. The method of claim 17, comprising detecting that the welding material has been changed in the GMAW torch.

19. The method of claim 17, comprising wirelessly transmitting the sensor signal from the sensor to the controller.

20. The method of claim 17, wherein the sensor is disposed within the GMAW torch.

* * * * *